(12) United States Patent
Lee

(10) Patent No.: US 11,590,915 B2
(45) Date of Patent: Feb. 28, 2023

(54) SYSTEM AND METHOD FOR CONTROLLING VEHICLE SAFETY DEVICE

(71) Applicant: HYUNDAI MOBIS CO., LTD., Seoul (KR)

(72) Inventor: Choong Ryung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 22 days.

(21) Appl. No.: 17/477,416

(22) Filed: Sep. 16, 2021

(65) Prior Publication Data

US 2022/0118932 A1    Apr. 21, 2022

(30) Foreign Application Priority Data

Oct. 15, 2020 (KR) .......................... 10-2020-0133551

(51) Int. Cl.
*B60R 21/0132* (2006.01)
*B60R 21/015* (2006.01)

(52) U.S. Cl.
CPC .... *B60R 21/01552* (2014.10); *B60R 21/0132* (2013.01); *B60R 21/01516* (2014.10); *B60R 21/01538* (2014.10); *B60R 21/01542* (2014.10); *B60R 21/01544* (2014.10); *B60R 21/01554* (2014.10); *B60R 2021/01327* (2013.01)

(58) Field of Classification Search
CPC ........ B60R 21/01552; B60R 21/01516; B60R 21/01538; B60R 21/01542; B60R 21/01544; B60R 21/0132; B60R 21/01554; B60R 2021/01327
See application file for complete search history.

(56) References Cited

FOREIGN PATENT DOCUMENTS

KR    2011-0093133    8/2011

*Primary Examiner* — Mathew Franklin Gordon
(74) *Attorney, Agent, or Firm* — DLA PIPER LLP (US)

(57) ABSTRACT

Disclosed is a system for controlling a vehicle safety device, the system including: a vehicle safety device configured to protect an occupant; a first occupant detection unit configured to detect a position of the occupant's movable body part; a second occupant detection unit configured to detect a position of the occupant's body part fixed to the safety device; a calculation unit configured to calculate information on the occupant's behavior in the event of a collision accident of a vehicle based on the position of the occupant's movable body part detected by the first occupant detection unit and the position of the occupant's body part fixed to the safety device detected by the second occupant detection unit; and a control unit configured to control an operation of the vehicle safety device for protecting the occupant based on the information on the occupant's behavior calculated by the calculation unit.

20 Claims, 6 Drawing Sheets

SYSTEM AND METHOD FOR CONTROLLING VEHICLE SAFETY DEVICE

CROSS REFERENCE TO RELATED APPLICATION

The present application claims priority to Korean Patent Application No. 10-2020-0133551, filed Oct. 15, 2020, the entire contents of which is incorporated herein for all purposes by this reference.

BACKGROUND OF THE INVENTION

Field of the Invention

The present disclosure relates to a system and method for controlling a vehicle safety device control, and more particularly, to a technology for controlling a vehicle safety device based on an occupant's position.

Description of the Related Art

In general, a vehicle is equipped with an airbag device having an airbag cushion that is inflated by receiving a gas from an inflator to protect an occupant in the event of a vehicle accident, and a seat belt connected to a vehicle seat to arrest an occupant. The airbag device is configured to protect the occupant as the airbag cushion is inflated and deployed when a gas, which is generated from an explosion of a gas-generating medium included in the inflator, is introduced into the airbag cushion in the event of a vehicle collision. The seat belt may be controlled so that tension is applied to the seat belt in the event of a collision accident of the vehicle.

In the related art, there is a technology that detects a position of an occupant's body using a sensor mounted in a seat, recognizes the position of the occupant's body based on the detection result, and controls an operation of an airbag or a seat belt of the vehicle.

However, the occupant's upper body may move, but the technology in the related art cannot detect a position of the occupant's movable upper body part. For this reason, there is a problem in that the occupant is injured by the deployment of the airbag cushion or the tension applied to the seat belt in the event of a collision accident of the vehicle.

The foregoing explained as the background is intended merely to aid in the understanding of the background of the present invention, and is not intended to mean that the present invention falls within the purview of the related art that is already known to those skilled in the art.

SUMMARY OF THE INVENTION

The present disclosure has been made in an effort to solve the above-mentioned problems, and an object of the present disclosure is to provide a technology for calculating information on an occupant's rapid behavior and effectively controlling a safety device in the event of a collision accident of the vehicle.

An exemplary embodiment of the present disclosure provides a system for controlling a vehicle safety device, the system including: a vehicle safety device configured to protect an occupant; a first occupant detection unit configured to detect a position of the occupant's movable body part; a second occupant detection unit configured to detect a position of the occupant's body part fixed to the safety device; a calculation unit configured to calculate information on the occupant's behavior in the event of a collision accident of a vehicle based on the position of the occupant's movable body part detected by the first occupant detection unit and the position of the occupant's body part fixed to the safety device detected by the second occupant detection unit; and a control unit configured to control an operation of the vehicle safety device for protecting the occupant based on the information on the occupant's behavior calculated by the calculation unit.

The first occupant detection unit may be connected to a camera sensor mounted in the vehicle to detect the position of the occupant's movable body part.

The calculation unit may set a coordinate value of a head, a chest, or an arm with respect to the position of the occupant's movable body part based on the position of the occupant's movable body part detected by the first occupant detection unit.

The second occupant detection unit may detect the occupant's body part fixed to the safety device through a seat sensor mounted in a seat and configured to detect a position or posture of the seat.

The calculation unit may set a position of the occupant's pelvis as a coordinate value based on the occupant's body part fixed to the safety device detected by the second occupant detection unit.

The seat sensor may detect whether the occupant is seated or detect a weight of the occupant seated in the seat, and the calculation unit may set a length of the occupant's body part fixed to the safety device based on the coordinate value of the position of the pelvis and the occupant's weight detected by seat sensor.

The seat sensor may include: an angle sensor configured to detect an angle by which a seatback is tilted; and a buckle sensor configured to detect an extension length of a seat belt or a position of the seat belt slid on a tongue, and the calculation unit may calculate a position of the occupant's fixed body based on a tilting angle of the seatback detected by the angle sensor, an extension length of the seat belt, or a position of the seat belt.

The calculation unit may configure body modeling connecting points of main parts of the occupant's body based on the position of the occupant's movable body part detected by the first occupant detection unit and the occupant's body part fixed to the safety device detected by the second occupant detection unit.

The first occupant detection unit or the second occupant detection unit may renew and detect the position of the occupant's body part for each preset renewal cycle, and the calculation unit may recognize the position of the occupant's body part based on the body modeling in the event of a collision accident of the vehicle during the preset renewal cycle.

The system may further include: an acceleration sensor configured to detect acceleration or angular velocity of the vehicle, and the calculation unit may calculate behavior information, which indicates that the main part of the body moves in the event of a vehicle accident, through a preset calculation formula based on the body modeling and the acceleration or angular velocity of the vehicle detected by the acceleration sensor.

The safety device may include a seat belt or an airbag, and the control unit may control whether to operate the seat belt or the airbag, an operation timing, or an operation amount based on the behavior information calculated by the calculation unit.

Another exemplary embodiment of the present disclosure provides a method of controlling a vehicle safety device, the method including: a first occupant detection step of detecting a position of an occupant's movable body part; a second occupant detection step of detecting a position of the occupant's body part fixed to the safety device; a calculation step of calculating information on the occupant's behavior in the event of a collision accident of the vehicle based on the position of the occupant's movable body part in the first occupant detection step and the position of the occupant's body part fixed to the safety device detected in the second occupant detection step; and a control step of controlling an operation of the vehicle safety device for protecting the occupant based on the information on the occupant's behavior calculated in the calculation step.

The first occupant detection step may be connected to a camera sensor mounted in the vehicle to detect the position of the occupant's movable body part.

In the calculation step, a coordinate value of a head, a chest, or an arm with respect to the position of the occupant's movable body part may be set based on the position of the occupant's movable body part detected in the first occupant detection step.

In the second occupant detection step, the occupant's body part fixed to the safety device may be detected by detecting a position or posture of a seat.

In the calculation step, a position of the occupant's pelvis may be set as a coordinate value based on the occupant's body part fixed to the safety device detected in the second occupant detection step.

In the second occupant detection step, whether the occupant is seated may be detected or a weight of the occupant seated in the seat may be detected. In the calculation step, a length of the occupant's body part fixed to the safety device may be set based on the coordinate value of the position of the pelvis and the occupant's weight detected by the seat sensor.

In the calculation step, body modeling connecting points of main parts of the occupant's body may be configured based on the position of the occupant's movable body part detected in the first occupant detection step and the occupant's body part fixed to the safety device detected in the second occupant detection step.

The method may further include: a renewal confirmation step of confirming renewal of the position of the occupant's body part for each preset renewal cycle after the first occupant detection step or the second occupant detection step, in which in the calculation step, the position of the occupant's body part is detected based on the body modeling in the event of a collision accident of the vehicle during the preset renewal cycle.

The method may further include: an acceleration sensing step of detecting acceleration or angular velocity of the vehicle before the calculation step, in which in the calculation step, behavior information, which indicates that the main part of the body moves in the event of a vehicle accident, is calculated through a preset calculation formula based on the body modeling and the acceleration or angular velocity of the vehicle detected by the acceleration sensor.

The safety device may include a seat belt or an airbag, and in the control step, whether to operate the seat belt or the airbag, an operation timing, or an operation amount may be controlled based on the behavior information calculated in the calculation step.

According to the system for controlling a vehicle safety device according to the present disclosure, the occupant's movable body part is detected by the camera sensor, the occupant's fixed body part is detected by the seat sensor, and the vehicle safety device may be controlled to correspond to the occupant's body part in the event of a collision accident of the vehicle.

In addition, the position of the occupant's body part is renewed for each preset cycle, and the body modeling connecting the positions of the occupant's body parts in the event of a vehicle accident during the renewal cycle. Therefore, it is possible to accurately detect the position of the occupant's body part even when the vehicle accident occurs during the renewal cycle.

DETAILED DESCRIPTION OF THE INVENTION

Figure 1:
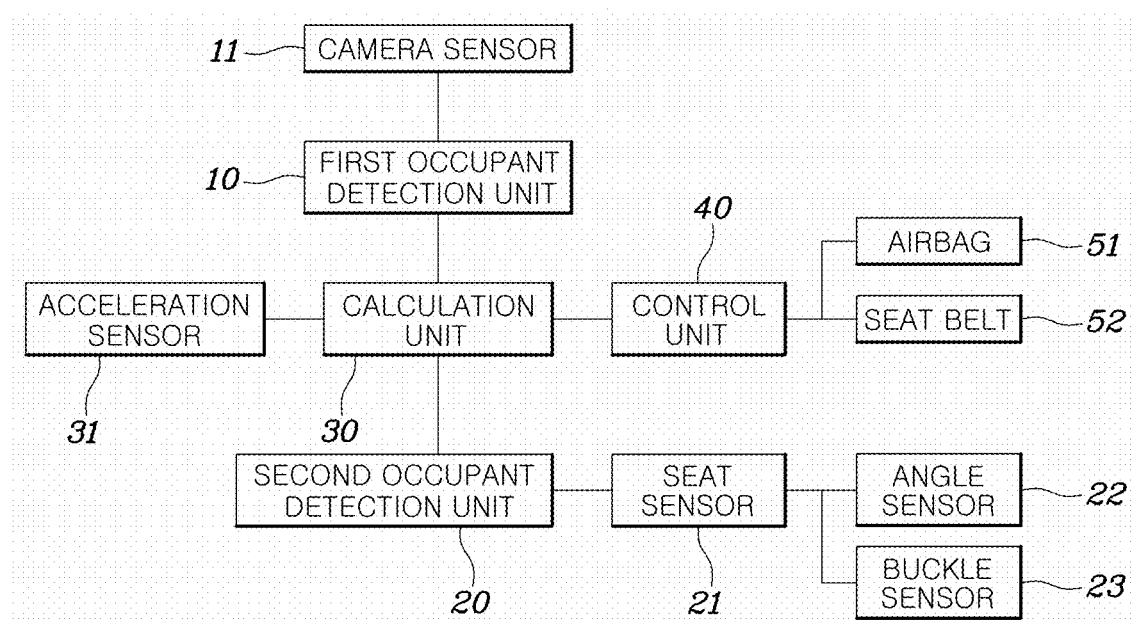
FIG. 1 is a configuration view illustrating a system for controlling a vehicle safety device according to an embodiment of the present disclosure.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first," "second," and other numerical terms may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, an exemplary embodiment of the present disclosure will be described in detail with reference to the accompanying drawings. Like reference numerals indicated in the respective drawings refer to like members.

A first passenger detection unit 10, a second passenger detection unit 20, a calculation unit 30, and a control unit 40 according to an exemplary embodiment of the present disclosure may be implemented by a non-volatile memory (not illustrated) configured to store algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Figure 2:
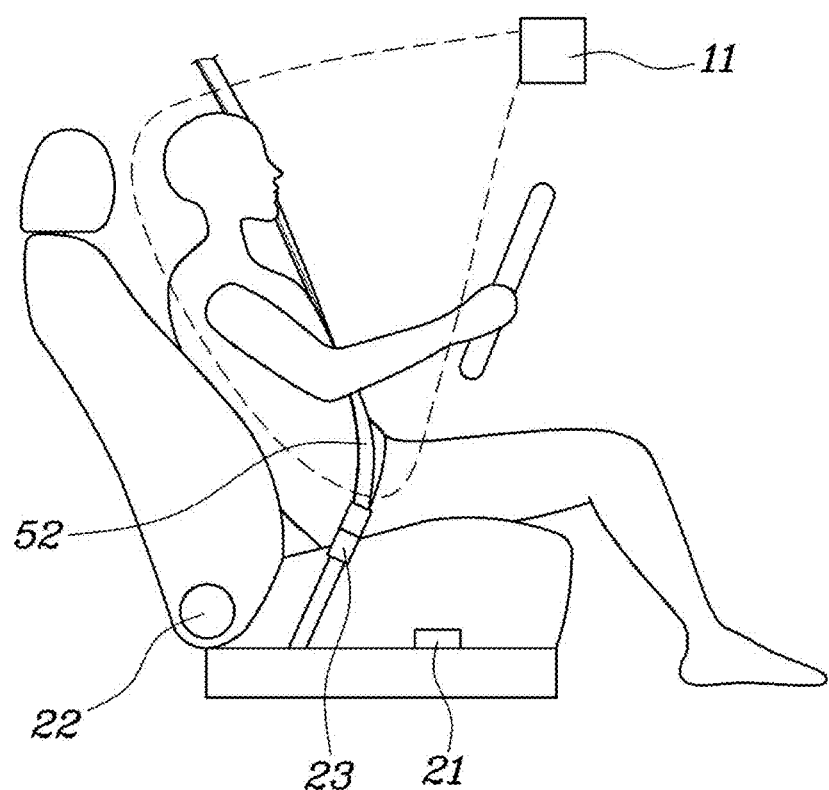
FIG. 2 is a view illustrating a state in which a camera sensor and a seat sensor of the system for controlling a vehicle safety device according to the embodiment of the present disclosure detect positions of an occupant's body parts.

FIG. 1 is a configuration view illustrating a system for controlling a vehicle safety device 50 according to an embodiment of the present disclosure, and FIG. 2 is a view illustrating a state in which a camera sensor 11 and a seat sensor 21 of the system for controlling the vehicle safety device 50 according to the embodiment of the present disclosure detect positions of an occupant's body parts.

An exemplary embodiment of the system for controlling the vehicle safety device 50 according to the present disclosure will be described with reference to FIGS. 1 to 2.

A vehicle is equipped with an airbag 51 and a seat belt 52 to protect an occupant in the event of a collision accident. In the event of a collision accident of the vehicle, the airbag 51 may be deployed to a position corresponding to the occupant's body to protect the occupant, and the seat belt 52 may receive tension and arrest the occupant to prevent the occupant from separating from the seat. However, there is a problem in that the occupant is injured by the airbag 51 or the seat belt 52 due to the occupant's abnormal seating. Therefore, a control method is required, which allows the airbag 51 to be deployed at a low pressure or prevents the tension from being applied to the seat belt 52.

The system for controlling the vehicle safety device 50 according to the present disclosure includes: the vehicle safety device 50 configured to protect the occupant; a first occupant detection unit 10 configured to detect a position of the occupant's movable body part; a second occupant detection unit 20 configured to detect a position of the occupant's body part fixed to the safety device 50; a calculation unit 30 configured to calculate information on the occupant's behavior in the event of a collision accident of the vehicle based on the position of the occupant's movable body part detected by the first occupant detection unit 10 and the position of the occupant's body part fixed to the safety device 50 detected by the second occupant detection unit 20; and a control unit 40 configured to control an operation of the vehicle safety device 50 for protecting the occupant based on the information on the occupant's behavior calculated by the calculation unit 30.

As illustrated in FIGS. 1 to 2, the first occupant detection unit 10 may detect the position of the movable body part among the occupant's body parts when the occupant is seated in the seat. The occupant's movable body part may be an upper body part such as a head, a chest, or an arm, and the first detection unit may continuously detect the occupant's movable body part for each preset cycle.

The second occupant detection unit 20 may detect the position of the occupant's body part fixed to the safety device 50 when the occupant is seated in the seat. The safety device 50 for fixing the occupant's body may be the seat belt 52. The occupant's pelvis or leg may be fixed to the seat by being arrested by the seat belt 52, and the second occupant detection unit 20 may detect the occupant's fixed body part.

The occupant's body may be moved by external impact in the event of a collision accident of the vehicle, and the calculation unit 30 may calculate the behavior information indicating the behavior of the occupant's body part in the event of a collision accident of the vehicle based on the positions of the occupant's body parts detected by the first occupant detection unit 10 and the second occupant detection unit 20.

The control unit 40 may control the safety device 50 such as the airbag 51 or the seat belt 52 of the vehicle based on the behavior information calculated by the calculation unit 30. In this case, based on the behavior information, the control unit 40 may perform control so that the airbag 51 is deployed with a low voltage or the tension is not applied to the seat belt 52 when the occupant is abnormally seated in the seat.

Therefore, it is possible to prevent the occupant from being injured by the safety device 50 in the event of a collision accident of the vehicle.

The first occupant detection unit 10 may be connected to the camera sensor 11 mounted in the vehicle to detect the position of the occupant's movable body part.

As illustrated in FIG. 2, the first occupant detection unit 10 may detect the occupant and the occupant's movable body part through the camera sensor 11 mounted in the vehicle. The occupant's movable body part may be mainly the upper body, and the camera sensor 11 may detect the head, the chest, or the arm, which is the occupant's movable body part, for each preset cycle.

Therefore, it is possible to continuously detect the position of the occupant's movable body part for each detection cycle of the camera sensor 11 even though the occupant's movable body part moves while the vehicle travels.

Figure 4:
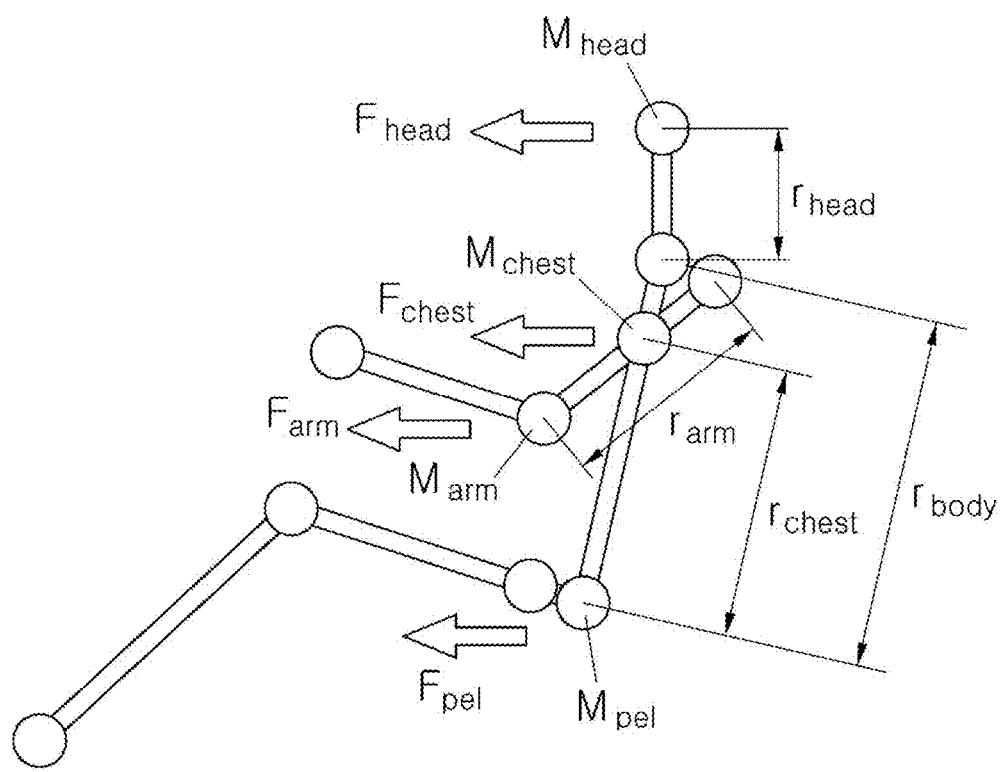
FIG. 4 is a view illustrating positions of the occupant's movable body parts, which are detected by the camera sensor of the system for controlling a vehicle safety device according to the embodiment of the present disclosure.

FIG. 4 is a view illustrating the positions of the occupant's movable body parts detected by the camera sensor 11 of the system for controlling the vehicle safety device 50 according to the embodiment of the present disclosure.

The calculation unit 30 may set coordinate values of the head, the chest, or the arm with respect to the position of the occupant's movable body part based on the position of the occupant's movable body part detected by the first occupant detection unit 10.

As illustrated in FIG. 4, the first occupant detection unit 10 may detect the position of the occupant's movable body part, and the calculation unit 30 may set three-dimensional coordinates of the main parts such as the occupant's head, chest and arm based on the position of the occupant's movable body part.

FIG. 4 is a view illustrating the positions of the occupant's movable body parts detected by the camera sensor 11 of the system for controlling the vehicle safety device 50 according to the embodiment of the present disclosure.

Referring to FIG. 4, the first occupant detection unit 10 may detect dimensions, between the occupant's preset parts, such as a length ($r_{chest}$) between the pelvic part and the chest part, a length ($r_{body}$) of the upper part, and a length ($r_{head}$) of the neck, which are preset for respective steps, and the calculation unit 30 may convert the occupant's body part detected by the first occupant detection unit 10 into the three-dimensional coordinates.

In addition, based on the occupant's body detected by the first occupant detection unit 10, the calculation unit 30 may set occupant models with effective mass ($M_{head}$) of the head part, effective mass ($M_{chest}$) of the chest part, and effective mass ($M_{pel}$) of the pelvic part which are preset.

Therefore, it is possible to accurately detect the upper body part, which is the occupant's movable body position, and place the upper body part on the three-dimensional coordinate, thereby detecting the effective mass of the corresponding part.

The second occupant detection unit 20 may detect the occupant's body part fixed to the safety device 50 through the seat sensor 21 which is mounted in the seat and detects a position or posture of the seat.

As illustrated in FIG. 2, the second occupant detection unit 20 may detect the position of the occupant's fixed body part by being connected to the seat sensor 21 which is mounted in the seat and detects a movement position of the seat or detects the occupant's seating posture.

The occupant's fixed body part may be the lower body part, i.e., the position of the pelvis or the knee.

Therefore, it is possible to accurately detect the position of the occupant's lower body part.

Figure 3:
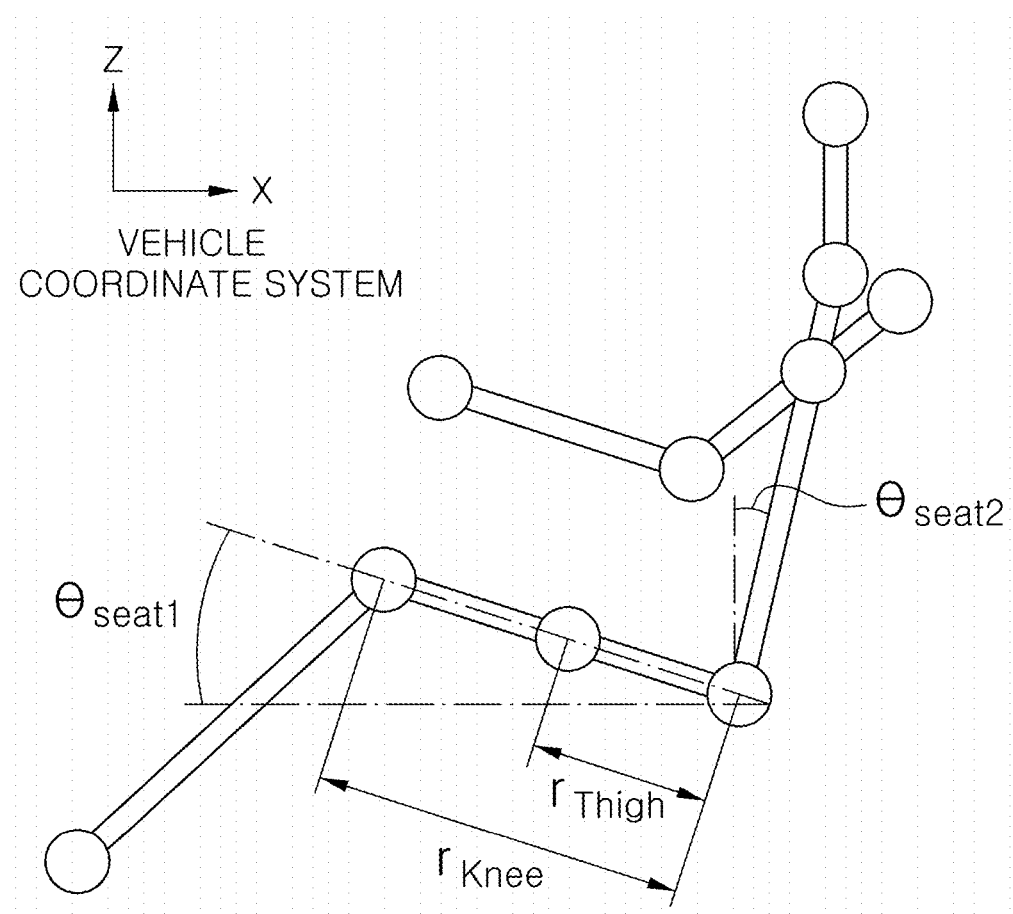
FIG. 3 is a view illustrating positions of the occupant's body parts fixed to a safety device, which are detected by the seat sensor of the system for controlling a vehicle safety device according to the embodiment of the present disclosure.

FIG. 3 is a view illustrating the positions of the occupant's body parts fixed to the safety device 50 detected by the seat sensor 21 of the system for controlling the vehicle safety device 50 according to the embodiment of the present disclosure.

The calculation unit 30 may set the position of the occupant's pelvis as a coordinate value based on the occupant's body part fixed to the safety device 50 detected by the second occupant detection unit 20.

Referring to FIG. 3, the occupant's pelvic part may be fixed by the safety device 50. The calculation unit 30 may set the three-dimensional coordinate of the occupant's pelvic part based on the position of the occupant's fixed body part detected by the second detection unit through the seat sensor 21.

The seat sensor may detect whether the occupant is seated or detect a weight of the occupant seated in the seat. The calculation unit 30 may set a length of the occupant's body part fixed to the safety device 50 based on the coordinate value of the position of the pelvis and the occupant's weight detected by the seat sensor.

The calculation unit 30 may detect the occupant's weight through a weight sensor and sort the occupant into a male, a female, or a child based on the occupant's weight. Based on the result of sorting the occupant, the calculation unit may set a length of the occupant's femur or a position of the occupant's knee in a preset.

As illustrated in FIG. 3, the three-dimensional coordinate of the position of the pelvic part may be set, a length ($r_{Thigh}$) of the femur from the position of the pelvic part may be set, a length ($r_{knee}$) from the pelvic part to the knee may be set, and the three-dimensional coordinate of the position of the knee may be set.

The length ($r_{knee}$) to the knee may be set by the following calculation formula.

$$\begin{bmatrix} x \\ y \\ z \end{bmatrix}_{knee} = \begin{bmatrix} x \\ y \\ z \end{bmatrix}_{pelvis} + r_{knee} \begin{bmatrix} \cos(\theta_{seat}) \\ 0 \\ \sin(\theta_{seat}) \end{bmatrix}.$$

In this case, $\theta_{real}$ may be an angle of the seat cushion.

In addition, as illustrated in FIG. 3, the second occupant detection unit 20 may detect an angle ($\theta_{seat1}$) of a seat cushion and an angle ($\theta_{seat2}$) of a seatback. Based on the angle ($\theta_{seat2}$) of the seatback, a distance ($r_{chest}$) to the occupant's chest part may be obtained from the calculation formula.

Therefore, it is possible to accurately detect the position of the occupant's lower body part and determine whether the occupant's lower body is normally seated or abnormally seated.

The seat sensor may include: an angle sensor 22 configured to detect an angle by which the seatback is tilted; and a buckle sensor 22 configured to detect an extension length of the seat belt 52 or the position of the seat belt 52 slid on a tongue. The calculation unit 30 may calculate the position of the occupant's fixed body part based on the tilting angle of the seatback detected by the angle sensor 22, the extension length of the seat belt 52, or the position of the seat belt 52.

Specifically, the second occupant detection unit 20 may detect the position and the posture of the seat using the sliding position of the seat cushion and the tilting angle of the seatback respectively detected by the seat position sensor and the angle sensor 22 included in the seat sensor 21.

In addition, the second occupant detection unit 20 may estimate the position of the occupant seated in the seat based on the position and the posture of the seat. As an embodiment, the second occupant detection unit 20 may estimate the position of the occupant's preset part on the assumption that the occupant is in close contact with the seatback and the seat cushion.

In this case, the occupant's preset part may be the occupant's pelvic part, head part, or chest part and further include the femur, the calf part, the elbow part, or the like.

The buckle sensor 22 may detect whether the occupant wears the seat belt 52. In the state in which the occupant wears the seat belt 52, the second occupant detection unit 20 may estimate the position of the occupant's preset part on the assumption that the occupant is in close contact with the seatback and the seat cushion.

In addition, the buckle sensor 22 may detect the extension length of the seat belt 52 in the state in which the tongue is inserted or detect the position of the seat belt 52 slid on the tongue. Therefore, it is possible to determine whether the occupant is seated in the seat or sort the seated occupant into a plurality of cases (an adult male, an adult female, a child, etc.).

On the contrary, the second occupant detection unit 20 cannot estimate the occupant's position when the occupant does not wear the seat belt 52.

The calculation unit 30 may configure body modeling connecting points of the main parts of the occupant's body based on the position of the occupant's movable body part detected by the first occupant detection unit 10 and the occupant's body part fixed to the safety device 50 detected by the second occupant detection unit 20.

Figure 5:
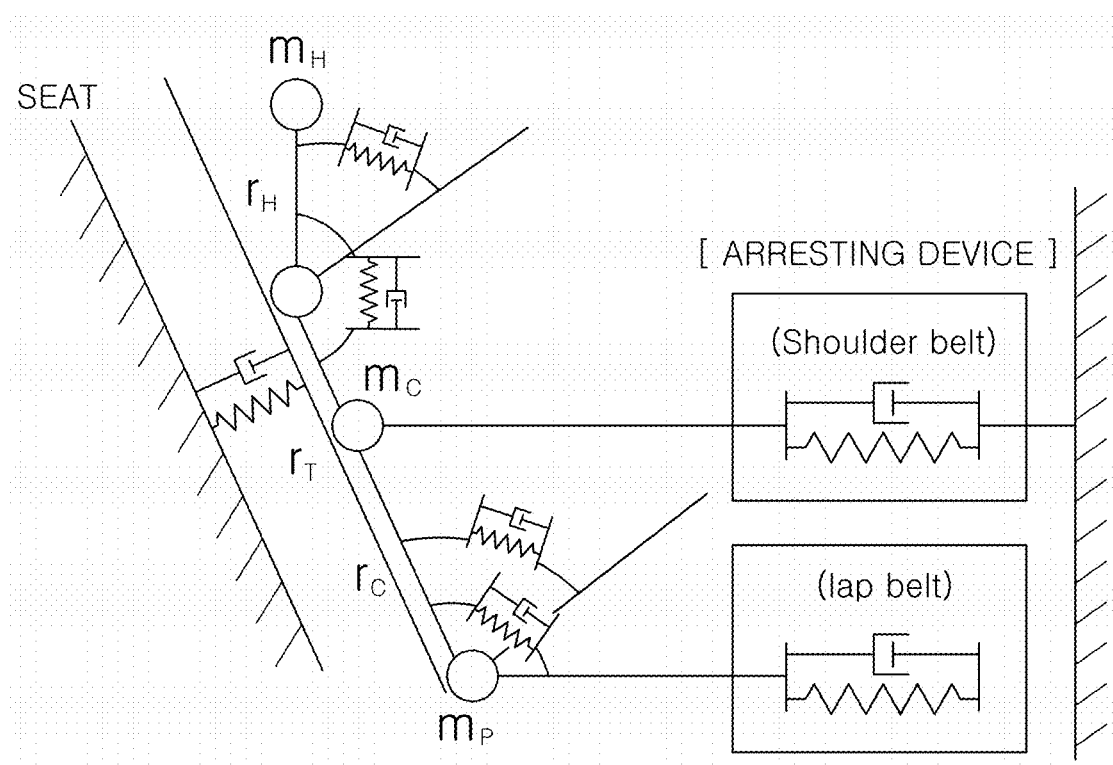
FIG. 5 is a view illustrating body modeling formed based on the positions of the occupant's body parts, which are detected by the camera sensor and the seat sensor according to the embodiment of the present disclosure.
Figure 6:
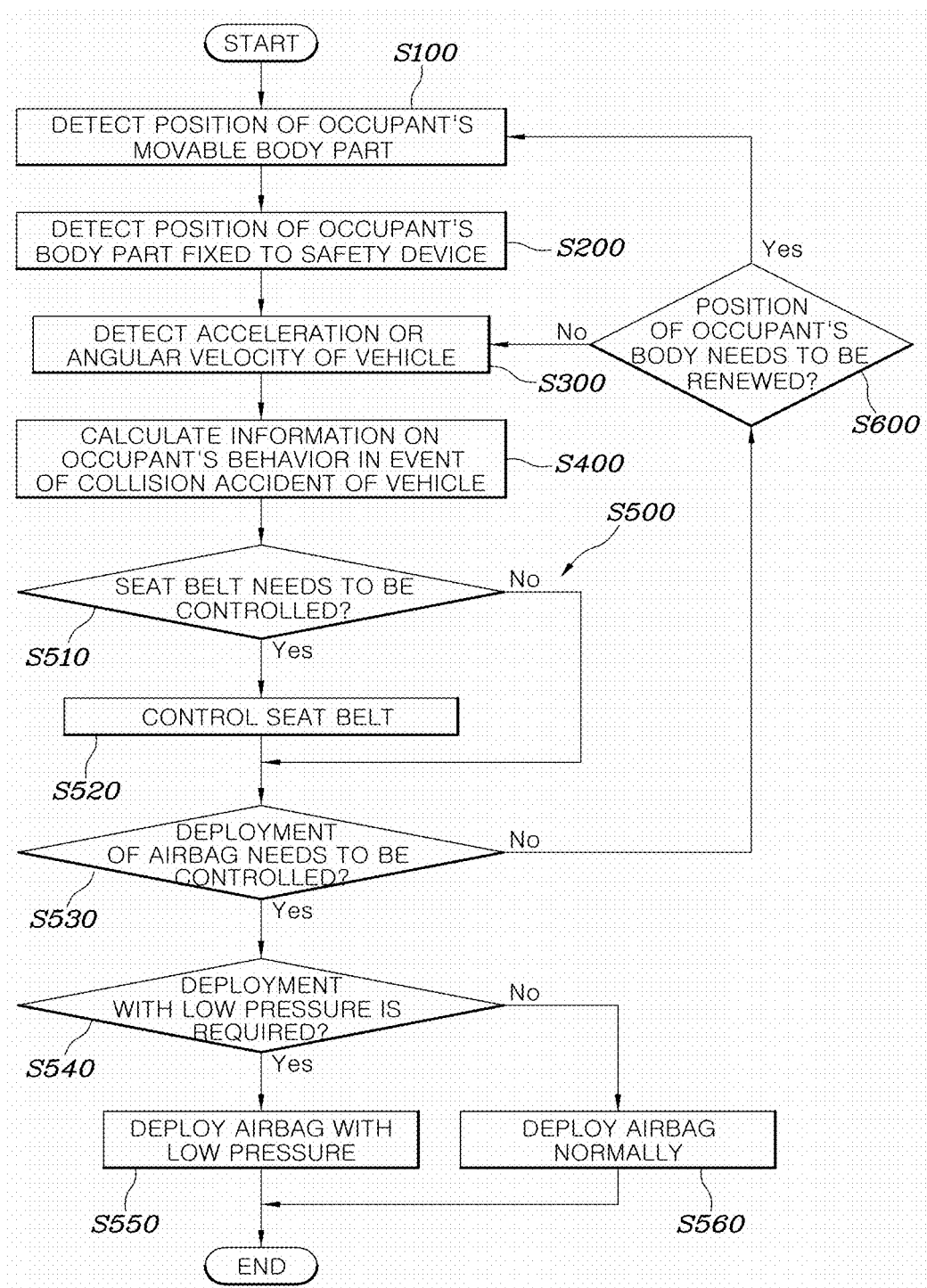
FIG. 6 is a flowchart illustrating a method of controlling a vehicle safety device according to the embodiment of the present disclosure.

Referring to FIG. 5, the modeling of the occupant's body may include a seat model (a linear or non-linear spring-damper model), a human body reaction force model (a linear or non-linear spring-damper model) indicating a reaction force applied to a joint of a human body, and an arresting device model (a linear or non-linear spring-damper model) in which a human body is arrested by the seat belt 52. Specifically, the arresting device may be the seat belt worn by the occupant. Particularly, the arresting device may include a lab belt for arresting the occupant's pelvic part and a shoulder belt for supporting a shoulder part.

Therefore, it is possible to accurately detect the position of the occupant's perfect body part by connecting the position of the occupant's movable body part detected by the first detection unit and the position of the occupant's body part fixed to the safety device 50 detected by the second detection unit.

The first occupant detection unit 10 or the second occupant detection unit 20 may renew and detect the position of the occupant's body part for each preset renewal cycle. The calculation unit 30 may check the position of the occupant's body part based on the body modeling in the event of a collision accident of the vehicle during a preset renewal cycle.

Referring to FIG. 5, the first occupant detection unit 10 and the second occupant detection unit 20 may renew and detect the position of the occupant's body part for each preset renewal cycle. When a collision accident of the vehicle occurs during the preset renewal cycle, the calculation unit 30 may calculate the information on the occupant's behavior based on the body modeling.

Therefore, the position of the occupant's body part may be recognized even in a section in which the first occupant detection unit 10 and the second occupant detection unit 20 do not detect the position of the occupant's body part. Further, the control unit 40 may control the safety device 50 based on the position of the occupant's body part.

An acceleration sensor configured to detect acceleration or angular velocity of the vehicle may be further provided. The calculation unit 30 may calculate behavior information, which indicates that the main part of the body moves in the event of a vehicle accident, through a preset calculation formula based on the body modeling and the acceleration or angular velocity of the vehicle detected by the acceleration sensor.

The acceleration sensor may be a gyro sensor configured to detect rectilinear acceleration or rotational angular velocity of the vehicle. Specifically, the acceleration sensor may detect acceleration in a longitudinal direction (X-axis) of the vehicle, a transverse direction (Y-axis), and a direction (Z-axis) perpendicular to the ground surface. Further, the acceleration sensor may detect an angular velocity in Yaw, Roll, and Pitch directions.

As an embodiment, the calculation unit 30 may detect whether the detected acceleration or angular velocity is a preset critical value or more. As another embodiment, the calculation unit 30 may detect whether a metric value using the detected acceleration or angular velocity is a preset critical value or more.

For example, it is possible to use a moving sum made by summing up the preset number of absolute values of the acceleration or angular velocity detected in a metric manner.

As illustrated in FIG. 4, the calculation unit 30 may calculate a force, which is applied at the position of the occupant's body part in the event of a collision accident of the vehicle, based on the acceleration detected by the acceleration sensor and the mass of the occupant's body part detected by the first occupant detection unit 10 or the second occupant detection unit 20.

The calculation unit 30 may recognize the position of the occupant's body part and the mass of the occupant's part based on the body modeling in the event of a collision accident of the vehicle, and calculate the behavior information, which indicates that the occupant's body part moves in the event of a collision accident of the vehicle, by inputting the acceleration value detected by the acceleration sensor into the preset calculation formula.

$$F_{head} = m_{head} a_{head}$$

Here, $m_{head}$ indicates the effective mass of the head part, and $a_{head}$ indicates the acceleration of the head part.

$$a_{head} = a_{ACU} - \frac{d\omega_{ACU}}{dt} \times r_{head} - 2\omega_{ACU} \times v_{head} - \omega_{ACU} \times (\omega_{ACU} \times r_{head})$$

$r_{head}$ indicates a distance from the occupant's upper body (shoulder) to the head part (effective center of mass), $V_{head}$ indicates a velocity of the occupant's head part, $a_{ACU}$ indicates the acceleration of the vehicle detected by the acceleration sensor, and $\omega_{ACU}$ indicates the angular velocity of the vehicle detected by the acceleration sensor.

In addition, the load applied to the chest part and the pelvic part of the occupant model may be estimated in the same way.

The safety device 50 includes the seat belt 52 or the airbag 51. The control unit 40 may control whether to operate the seat belt 52 or the airbag 51, an operation timing, or an operation amount based on the behavior information calculated by the calculation unit 30.

As an embodiment, when the behavior in which the occupant's chest part or pelvic part moves forward is estimated, the control unit 40 may control an operation of a pre-tensioner so that the seat belt 52 is pulled.

As another embodiment, in the case of the behavior in which the occupant's head part moves forward, the control unit 40 may deploy the front airbag 51. When the occupant is a child or female having a small body or when the airbag 51 need not be deployed due to an abnormal posture of the occupant seated in the seat, the airbag 51 may not be deployed. When a low-pressure deployment condition is satisfied, the airbag 51 may be deployed with a low pressure.

As another embodiment, in the case of the behavior in which the occupant moves in the transverse direction, the control unit 40 may control and deploy in advance a side airbag 51 or a far-side airbag between the driver seat and the passenger seat.

A method of controlling the vehicle safety device 50 according to the embodiment of the present disclosure includes: a first occupant detection step S100 of detecting the position of the occupant's movable body part; a second occupant detection step S200 of detecting the position of the occupant's body part fixed to the safety device 50; a calculation step S400 of calculating information on the occupant's behavior in the event of a collision accident of the vehicle based on the position of the occupant's movable body part detected in the first occupant detection step S100 and the position of the occupant's body part fixed to the safety device 50 detected in the second occupant detection step S200; and a control step S500 of controlling the operation of the vehicle safety device 50 for protecting the occupant based on the information on the occupant's behavior calculated in the calculation step S400.

The first occupant detection step S100 may be connected to the camera sensor 11 mounted in the vehicle and detect the position of the occupant's movable body part.

In the calculation step S400, the coordinate values of the head, the chest, or the arm with respect to the position of the occupant's movable body part may be set based on the position of the occupant's movable body part detected in the first occupant detection step S100.

The second occupant detection step S200 may detect the occupant's body part fixed to the safety device 50 by detecting the position or posture of the seat.

In the calculation step S400, the position of the occupant's pelvis may be set as a coordinate value based on the occupant's body part fixed to the safety device 50 detected in the second occupant detection step S200.

In the second occupant detection step S200, whether the occupant is seated may be detected or a weight of the occupant seated in the seat may be detected. In the calculation step S400, a length of the occupant's body part fixed to the safety device 50 may be set based on the coordinate value of the position of the pelvis and the occupant's weight detected by the seat sensor.

The seat sensor may include: an angle sensor 22 configured to detect an angle by which the seatback is tilted; and a buckle sensor 22 configured to detect an extension length of the seat belt 52 or the position of the seat belt 52 slid on a tongue.

In the calculation step S400, the position of the occupant's fixed body part may be calculated based on the tilting angle of the seatback detected by the angle sensor 22, the extension length of the seat belt 52, or the position of the seat belt 52.

In the calculation step S400, the body modeling connecting points of the main parts of the occupant's body may be configured based on the position of the occupant's movable body part detected in the first occupant detection step S100 and the occupant's body part fixed to the safety device 50 detected in the second occupant detection step S200.

The method further includes a renewal confirmation step S600 of confirming the renewal of the position of the occupant's body part for each preset renewal cycle after the first occupant detection step S100 or the second occupant detection step S200. In the calculation step S400, the position of the occupant's body part may be detected based on the body modeling in the event of a collision accident of the vehicle during the preset renewal cycle.

The method further includes an acceleration sensing step S400 of detecting the acceleration or angular velocity of the vehicle before the calculation step S400. In the calculation step S400, the behavior information, which indicates that the main part of the body moves in the event of a vehicle accident, may be calculated through a preset calculation formula based on the body modeling and the acceleration or angular velocity of the vehicle detected by the acceleration sensor.

The safety device 50 includes the seat belt 52 or the airbag 51. In the control step S500, whether to operate the seat belt 52 or the airbag 51, an operation timing, or an operation amount may be controlled based on the behavior information calculated in the calculation step S400.

In the step S500 of controlling the safety device 50, whether the tension needs to be applied to the seat belt 52 is determined (S510), and the seat belt may be controlled (S520) based on whether the tension needs to be applied to the seat belt 52.

In addition, in the step S500 of controlling the safety device 50, whether the airbag 51 needs to be deployed is determined (S530), and the deployment of the airbag 51 may be controlled (S550 and S560).

In addition, whether the condition (the occupant's abnormal behavior or the like) in which the airbag 51 is deployed with a low pressure may be determined (S540), and the airbag 51 may be deployed with a low pressure when the low-pressure deployment condition is satisfied (S550).

In addition, when the deployment condition of the airbag 51 is not satisfied (S530), whether the renewal condition is satisfied may be determined (S600). As an embodiment, an initialization condition may be the preset elapse of time from a point in time at which a change in occupant's rapid behavior is predicted.

While the specific embodiments of the present invention have been illustrated and described above, it will be obvious to those skilled in the art that the present invention may be variously modified and changed without departing from the technical spirit of the present invention defined in the appended claims.

What is claimed is:

1. A system for controlling a vehicle safety device, the system comprising:
   a vehicle safety device configured to protect an occupant;
   at least one processor; and
   at least one non-volatile memory comprising instructions that, when executed by the at least one processor, cause the at least one processor to perform processing comprising:
   detecting a position of the occupant's movable body part;
   detecting a position of the occupant's body part fixed to the safety device;
   calculating information on the occupant's behavior in the event of a collision accident of a vehicle based on the detected position of the occupant's movable body part and the detected position of the occupant's body part fixed to the safety device; and controlling an operation of the vehicle safety device to protect the occupant based on the information on the occupant's behavior calculated by the calculating.

2. The system of claim 1, wherein the at least one processor is connected to a camera sensor mounted in the vehicle and configured to detect the position of the occupant's movable body part.

3. The system of claim 2, wherein the processing further comprises setting a coordinate value of a head, a chest, or an arm with respect to the position of the occupant's movable body part based on the detected position of the occupant's movable body part.

4. The system of claim 1, wherein the at least one processor is configured to detect the occupant's body part fixed to the safety device through a seat sensor mounted in a seat and configured to detect a position or posture of the seat.

5. The system of claim 4, wherein the processing further comprises setting a position of the occupant's pelvis as a coordinate value based on the detected position of the occupant's body part fixed to the safety device.

6. The system of claim 5, wherein the seat sensor is configured to detect whether the occupant is seated or to detect a weight of the occupant seated in the seat, and the processing further comprises setting a length of the occupant's body part fixed to the safety device based on the coordinate value of the position of the pelvis and the occupant's weight detected by the seat sensor.

7. The system of claim 5, wherein the seat sensor comprises:
an angle sensor configured to detect an angle by which a seatback is tilted; and
a buckle sensor configured to detect an extension length of a seat belt or a position of the seat belt slid on a tongue, and
wherein the calculating comprises calculating a position of the occupant's fixed body based on a tilting angle of the seatback detected by the angle sensor, an extension length of the seat belt, or a position of the seat belt.

8. The system of claim 1, wherein the processing further comprises configuring body modeling connecting points of main parts of the occupant's body based on the detected position of the occupant's movable body part and the detected position of the occupant's body part fixed to the safety device.

9. The system of claim 8, wherein at least one of the detecting the position of the occupant's movable body part and the detecting the position of the occupant's body part fixed to the safety device is renewed for each of a plurality of preset renewal cycles, and the processing further comprises recognizing the position of the occupant's body part based on the body modeling in the event of a collision accident of the vehicle during the preset renewal cycle.

10. The system of claim 8, further comprising:
an acceleration sensor configured to detect acceleration or angular velocity of the vehicle, wherein
the calculating further comprises calculating behavior information, which indicates that the main part of the body moves in the event of a vehicle accident, through a preset calculation formula based on the body modeling and the acceleration or angular velocity of the vehicle detected by the acceleration sensor.

11. The system of claim 1, wherein the safety device comprises a seat belt or an airbag, and the controlling includes determining whether to operate the seat belt or the airbag, an operation timing, or an operation amount based on the calculated behavior information.

12. A method of controlling a vehicle safety device, the method comprising:
detecting a position of an occupant's movable body part;
detecting a position of the occupant's body part fixed to the safety device;
calculating information on the occupant's behavior in the event of a collision accident of the vehicle based on the detected position of the occupant's movable body part and the detected position of the occupant's body part fixed to the safety device; and
controlling an operation of the vehicle safety device for protecting the occupant based on the calculated information on the occupant's behavior.

13. The method of claim 12, wherein the detecting the position of the occupant's movable body part is based on data from a camera sensor mounted in the vehicle and configured to detect the position of the occupant's movable body part.

14. The method of claim 13, wherein in the calculating, a coordinate value of a head, a chest, or an arm with respect to the position of the occupant's movable body part is set based on the detected position of the occupant's movable body part.

15. The method of claim 12, wherein the detecting the position of the occupant's body part fixed to the safety device is based on detecting a position or posture of a seat.

16. The method of claim 15, wherein in the calculating, a position of the occupant's pelvis is set as a coordinate value based on the detected occupant's body part fixed to the safety device.

17. The method of claim 12, wherein in the calculating, body modeling connecting points of main parts of the occupant's body is configured based on the detected position of the occupant's movable body part and the detected position of the occupant's body part fixed to the safety device.

18. The method of claim 17, further comprising:
confirming renewal of the position of the occupant's body part for each of a plurality of preset renewal cycles after the detecting the position of the occupant's movable body part or the detecting the position of the occupant's body part fixed to the safety device,
wherein in the calculating, the position of the occupant's body part is detected based on the body modeling in the event of a collision accident of the vehicle during the preset renewal cycle.

19. The method of claim 17, further comprising:
detecting acceleration or angular velocity of the vehicle before the calculating,
wherein in the calculating, behavior information, which indicates that the main part of the body moves in the event of a vehicle accident, is calculated through a preset calculation formula based on the body modeling and the acceleration or angular velocity of the vehicle detected by the acceleration sensor.

20. The method of claim 12, wherein the safety device comprises a seat belt or an airbag, and in the controlling, whether to operate the seat belt or the airbag, an operation timing, or an operation amount is controlled based on the calculated behavior information.

* * * * *